United States Patent
Li et al.

(10) Patent No.: US 10,581,688 B2
(45) Date of Patent: Mar. 3, 2020

(54) METHODS FOR AUTOMATICALLY CONFIGURING MULTIPLE CHASSIS LINK AGGREGATION GROUP (MC-LAG)

(71) Applicant: QUANTA COMPUTER INC., Taoyuan (TW)

(72) Inventors: Cheng-Hsun Li, Taoyuan (TW); Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/787,353

(22) Filed: Oct. 18, 2017

(65) Prior Publication Data
US 2018/0367408 A1  Dec. 20, 2018

Related U.S. Application Data

(60) Provisional application No. 62/521,808, filed on Jun. 19, 2017.

(51) Int. Cl.
*H04L 12/24* (2006.01)
*H04L 12/741* (2013.01)
(Continued)

(52) U.S. Cl.
CPC ...... *H04L 41/0893* (2013.01); *H04L 41/0886* (2013.01); *H04L 41/12* (2013.01);
(Continued)

(58) Field of Classification Search
CPC ....... H04L 12/24; H04L 12/741; H04L 29/08; H04L 12/709; H04L 41/06; H04L 45/28;
(Continued)

(56) References Cited

U.S. PATENT DOCUMENTS

| 8,767,735 B2 * | 7/2014 | Jacob Da Silva .... H04L 45/245 370/392 |
| 2007/0005968 A1 * | 1/2007 | Lu ......................... H04L 12/66 713/168 |

(Continued)

FOREIGN PATENT DOCUMENTS

JP   2017050708 A   3/2017

OTHER PUBLICATIONS

JP Office Action for Application No. 2018-077833, dated Dec. 11, 2018, w/ First Office Action Summary.
Extended European Search Report for EP Application No. 18163115.1, dated Nov. 9, 2018.

*Primary Examiner* — Jeffrey M Rutkowski
*Assistant Examiner* — Sudesh M Patidar
(74) *Attorney, Agent, or Firm* — Nixon Peabody LLP; Zhou Lu

(57) ABSTRACT

The present disclosure provides a system and method for automatically configuring multiple chassis links in a multi-chassis system using a management controller. The management controller can request and receive switch port data from a plurality of server systems, and a plurality of switches of the multi-chassis system. Based upon received switch port data, the management controller can determine peer link ports for a first switch and a second switch of the plurality of switches; select suitable port groups from a plurality of ports of the first switch and the second switch based upon the received switch port data; and configure ports in each suitable port group as a MC-LAG member port for the corresponding suitable port group.

14 Claims, 9 Drawing Sheets

(51) Int. Cl.
  *H04L 29/08*  (2006.01)
  *H04L 12/709*  (2013.01)
  *H04L 12/707*  (2013.01)
  *H04L 12/703*  (2013.01)

(52) U.S. Cl.
  CPC .......... *H04L 45/245* (2013.01); *H04L 45/745* (2013.01); *H04L 67/1042* (2013.01); *H04L 45/22* (2013.01); *H04L 45/28* (2013.01)

(58) Field of Classification Search
  CPC ....... H04L 47/41; H04L 45/24; H04L 45/245; H04L 45/58; H04L 45/00; H04L 49/70; H04L 12/28; H04L 12/40136; H04L 47/827
  See application file for complete search history.

(56) References Cited

U.S. PATENT DOCUMENTS

| | | | |
|---|---|---|---|
| 2009/0003336 A1* | 1/2009 | Daines | H04L 41/12 370/389 |
| 2013/0315097 A1 | 11/2013 | Yang et al. | |
| 2014/0133486 A1* | 5/2014 | Sivasankar | H04L 47/41 370/392 |
| 2014/0247829 A1* | 9/2014 | Gautam | H04L 29/0653 370/392 |
| 2015/0163100 A1* | 6/2015 | Graf | H04L 41/12 370/255 |
| 2016/0294632 A1 | 10/2016 | Bhatia et al. | |
| 2017/0163473 A1 | 6/2017 | Sadana et al. | |

* cited by examiner

| Port ID (self info) | Node ID (self info) | MAC Address (self info) | Neighbor MAC Address (neighbor info) |
|---|---|---|---|
| P1 | Switch1 | AA:00:00:00:00:01 | 10:00:00:00:00:00 |
| P2 | Switch1 | AA:00:00:00:00:02 | BB:00:00:00:00:02 |
| P3 | Switch1 | AA:00:00:00:00:03 | CC:00:00:00:00:03 |
| ... | Switch1 | ... | ... |
| ... | Switch1 | ... | ... |
| Pm | Switch1 | AA:00:00:00:00:0m | DD:00:00:00:00:0m |

FIG. 1C

| Port ID | Node ID | MAC Address (self info) | Neighbor MAC Address (neighbor info) |
|---|---|---|---|
| Pm+1 | Switch2 | BB:00:00:00:00:01 | AA:00:00:00:00:0F |
| Pm+2 | Switch2 | BB:00:00:00:00:02 | AA:00:00:00:00:10 |
| Pm+3 | Switch2 | BB:00:00:00:00:03 | 10:40:00:00:00:04 |
| ... | Switch2 | ... | ... |
| ... | Switch2 | ... | ... |
| Pn | Switch2 | BB:00:00:00:00:0n | DD:00:00:00:00:0n |

FIG. 1D

| Port ID (self info) | Node ID (self info) | MAC Address (self info) | Neighbor MAC Address (neighbor info) |
|---|---|---|---|
| Pn+1 | System100 | 10:00:00:00:00:00 | AA:00:00:00:00:03 |
| Pn+2 | System102 | 10:20:00:00:00:02 | AA:00:00:00:00:05 |
| Pn+3 | System102 | 10:20:00:00:00:03 | AA:00:00:00:00:07 |
| Pn+4 | System104 | 10:40:00:00:00:0B | AA:00:00:00:00:0B |
|  | System104 | 10:40:00:00:00:05 | BB:00:00:00:00:05 |
| ... | System106 | 10:40:00:00:00:06 | BB:00:00:00:00:05 |
| ... | Switch310 | 31:00:00:00:00:03 | AA:00:00:00:00:10 |
| ... | Switch310 | 31:00:00:00:00:04 | BB:00:00:00:00:04 |
| ... | Switch320 | 32:00:00:00:00:01 | BB:00:00:00:00:0E |
| Px | Switch320 | 32:00:00:00:00:02 | BB:00:00:00:00:10 |

FIG. 1E

| Port ID | Node ID | MAC Address (self info) | Neighbor MAC Address (neighbor info) | Node corresponding to neighbor |
|---|---|---|---|---|
| P1 | Switch1 | AA:00:00:00:00:01 | 10:00:00:00:00:00 | |
|  | Switch1 | AA:00:00:00:00:02 | BB:00:00:00:00:02 | |
|  | Switch1 | AA:00:00:00:00:03 | CC:00:00:00:00:03 | |
| Pmatch | Switch1 | AA:00:00:00:00:0B | 10:40:00:00:00:0B | |
|  | Switch1 | ... | ... | |
| Pm | Switch1 | AA:00:00:00:00:0m | DD:00:00:00:00:0m | |
| Pm+1 | Switch2 | BB:00:00:00:00:01 | AA:00:00:00:00:0F | |
| Pm+2 | Switch2 | BB:00:00:00:00:02 | AA:00:00:00:00:10 | |
| Pm+3 | Switch2 | BB:00:00:00:00:03 | 10:40:00:00:00:04 | |
| .. | Switch2 | ... | ... | |
| .. | Switch2 | ... | ... | |
| Pn | Switch2 | BB:00:00:00:00:0n | DD:00:00:00:00:0n | |
| Pn+1 | System100 | 10:00:00:00:00:00 | AA:00:00:00:00:03 | |
| Pn+2 | System102 | 10:20:00:00:00:02 | AA:00:00:00:00:05 | |
| Pn+3 | System102 | 10:20:00:00:00:03 | AA:00:00:00:00:0B | Switch1 |
| Pn+4 | System104 | 10:40:00:00:00:0B | AA:00:00:00:00:0B | |
|  | System104 | 10:40:00:00:00:05 | BB:00:00:00:00:05 | |
| ... | System106 | 10:40:00:00:00:06 | BB:00:00:00:00:05 | |
| ... | Switch310 | 31:00:00:00:00:03 | AA:00:00:00:00:10 | |
| ... | Switch310 | 31:00:00:00:00:04 | BB:00:00:00:00:04 | |
| ... | Switch320 | 32:00:00:00:00:01 | BB:00:00:00:00:0E | |
| Px | Switch320 | 32:00:00:00:00:02 | BB:00:00:00:00:10 | |

FIG. 1F

| Port ID | Node ID | MAC Address (self info) | Neighbor MAC Address (neighbor info) | Node containing neighbor Node |
|---|---|---|---|---|
| P4 | Switch1 | AA:00:00:00:00:04 | 10:00:00:00:00:00 | System100 |
| P5 | Switch1 | AA:00:00:00:00:05 | 10:20:00:00:00:02 | System102 |
| P7 | Switch1 | AA:00:00:00:00:07 | 10:20:00:00:00:03 | System102 |
| P10 | Switch1 | AA:00:00:00:00:0A | 31:00:00:00:00:03 | Switch310 |
| P11 | Switch1 | AA:00:00:00:00:0B | 10:40:00:00:00:08 | System104 |
| P15 | Switch1 | AA:00:00:00:00:0F | BB:00:00:00:00:01 | Switch2 |
| P16 | Switch1 | AA:00:00:00:00:10 | BB:00:00:00:00:02 | Switch2 |
| Pm+1 | Switch2 | BB:00:00:00:00:01 | AA:00:00:00:00:0F | Switch1 |
| Pm+2 | Switch2 | BB:00:00:00:00:02 | AA:00:00:00:00:10 | Switch1 |
| Pm+4 | Switch2 | BB:00:00:00:00:04 | 31:00:00:00:00:04 | Switch310 |
| Pm+5 | Switch2 | BB:00:00:00:00:05 | 10:40:00:00:00:05 | System104 |
| Pm+8 | Switch2 | BB:00:00:00:00:08 | 10:40:00:00:00:06 | System106 |
| Pm+14 | Switch2 | BB:00:00:00:00:0E | 32:00:00:00:00:01 | Switch320 |
| Pm+16 | Switch2 | BB:00:00:00:00:10 | 32:00:00:00:00:01 | Switch320 |

FIG. 1G

Peer link ports of Switch1

| Port ID | Node ID | MAC Address (self info) | Neighbor MAC Address (neighbor info) | Node containing neighbor Node |
|---|---|---|---|---|
| P15 | Switch1 | AA:00:00:00:00:0F | BB:00:00:00:00:01 | Switch2 |
| P16 | Switch1 | AA:00:00:00:00:10 | BB:00:00:00:00:02 | Switch2 |

Condition (a)                                    Condition (b)

| Port ID | Node ID | MAC Address (self info) | Neighbor MAC Address (neighbor info) | Node containing neighbor Node |
|---|---|---|---|---|
| Pm+1 | Switch2 | BB:00:00:00:00:01 | AA:00:00:00:00:0F | Switch1 |
| Pm+2 | Switch2 | BB:00:00:00:00:02 | AA:00:00:00:00:10 | Switch1 |

Peer link ports of Switch2

| | Port ID | Node ID | Port Address (24 bit) | Registered Node address (48 bit) | Node currently accessed (new only) |
|---|---|---|---|---|---|
| X | P4 | Switch1 | AA:00:00:00:00:04 | 10:00:00:00:00:00 | System100 |
| X | P5 | Switch1 | AA:00:00:00:00:05 | 10:20:00:00:00:02 | System102 |
| X | P7 | Switch1 | AA:00:00:00:00:07 | 10:20:00:00:00:03 | System102 |
| O | P10 | Switch1 | AA:00:00:00:00:0A | 31:00:00:00:00:03 | Switch310 |
| O | Pm+4 | Switch2 | BB:00:00:00:00:04 | 31:00:00:00:00:04 | Switch310 |
| O | P11 | Switch1 | AA:00:00:00:00:0B | 10:40:00:00:00:08 | System104 |
| O | Pm+5 | Switch2 | BB:00:00:00:00:05 | 10:40:00:00:00:05 | System104 |
| X | Pm+8 | Switch2 | BB:00:00:00:00:08 | 10:40:00:00:00:06 | System106 |
| X | Pm+14 | Switch2 | BB:00:00:00:00:0E | 32:00:00:00:00:01 | Switch320 |
| X | Pm+16 | Switch2 | BB:00:00:00:00:10 | 32:00:00:00:00:01 | Switch320 |

FIG. 1J

METHODS FOR AUTOMATICALLY CONFIGURING MULTIPLE CHASSIS LINK AGGREGATION GROUP (MC-LAG)

CROSS REFERENCE OF RELATED APPLICATION

This application claims the benefit under 35 U.S.C. § 119(e) of U.S. Provisional Patent Application No. 65/521,808 filed Jun. 19, 2017, which is incorporated herein by reference in its entirety.

FIELD OF THE INVENTION

The present disclosure generally relates to server systems.

BACKGROUND

MC-LAG (Multi-Chassis Link Aggregation Group) is a type of link aggregation group with constituent ports that terminate on separate node (chassis), primarily for the purpose of providing redundancy in an event that one of the node (chassis) fails. The MC-LAG technology increases bandwidth and link redundancy by connecting two or more physical cables to form a logical/virtual channel. Also, in MC-LAG, two network switches can communicate protocol messages on certain designated ports (e.g., "peer links") to form a logical switch. Even when one of the switches is broken down, the other switch can still function normally. Thus, the MC-LAG technology also enhances bandwidth and redundancy in network switch node level.

However, it is a time-consuming procedure for network administrators to setup configurations on MC-LAG switches in a network topology containing multiple nodes. In conventional methods, network administrators need to plan the network topology carefully, in order to know which network interface controller (NIC) ports are connected to MC-LAG switch ports, and to know which upstream and downstream switches are connected to the MC-LAG switches. As the network topology grows and/or dynamically changes over time, the procedure to set-up the configurations on MC-LAG switches can become even more challenging for network administrators.

SUMMARY

Systems and methods in accordance with various examples of the present disclosure provide a solution to the above-mentioned problems by automatically configuring multiple chassis links in a multi-chassis system using a management controller. The management controller can be a specific system (e.g., a specific chassis, a specific server system, or a specific node), a BMC (baseboard management controller), or a RMC (rack management controller) that is capable of configuring MC-LAG network switches. The management controller can request and receive switch port data from a plurality of server systems, and a plurality of switches of the multi-chassis system. Based upon received switch port data, the management controller can determine a plurality of match ports and a plurality of match nodes. The management controller can further determine peer link ports for a first switch and a second switch of the plurality of switches. The peer link ports are a subset of the plurality of match ports. Each peer link port of the peer link ports belongs to one of the first switch and the second switch, and corresponds to a match node of the plurality of match nodes that is the other one of the first switch and the second switch.

In accordance with one aspect of the present disclosure, a computer-implemented method for automatically configuring multiple chassis links in a multi-chassis system, comprises: (1) requesting switch port data from a plurality of server systems and a plurality of switches of the multi-chassis system; (2) receiving the switch port data, the switch port data including internal and neighbor port addresses of the plurality of server systems and the plurality of switches; (3) determining a plurality of match ports and a plurality of match nodes, wherein each of the plurality of match ports has a port address matching one of the neighbor port addresses, each of the plurality of match nodes corresponding to one of the plurality of match ports; and (4) determining peer link ports for a first switch and a second switch of the plurality of switches. The peer link ports are a subset of the plurality of match ports. Each peer link port of the peer link ports belongs to one of the first switch the second switch, and corresponds to a match node of the plurality of match nodes that is the other one of the first switch the second switch.

In some examples, the computer-implemented method further comprises: grouping a plurality of ports of the first switch and the second switch into a plurality of port groups based upon the switch port data and one or more predetermined criteria; selecting a first subset of port groups from the plurality of port groups; and configuring all ports in each port group of the first subset of port groups as a same member port. A port group in the first subset of port groups has at least one port belonging to the first switch and at least another port belonging to the second switch In some examples, determining the plurality of match ports and the plurality of match nodes further comprises: going through the neighbor port addresses for each port of the first switch and the second switch; grouping a specific port into the plurality of match ports if the specific port's address matches any of the neighbor port addresses of the first switch and the second switch; and grouping a corresponding node that contains the specific port into the plurality of match nodes.

In some examples, the multi-chassis system is compatible with IEEE 802.1AX™-2008 standard. The plurality of server systems and a plurality of switches in the multi-chassis system can use various protocols to advertise corresponding identity, capacity, and neighbors on a network of the multi-chassis system. The various protocols for advertising identity, capacity, and neighbors include, but are not limited to, LLDP (Link Layer Discovery Protocol), CDP (Cisco Discovery Protocol), or provision method(s) provided by specific vendors.

In some examples, the management controller of the multi-chassis system can use a variety of protocols to request the switch port data, which includes but is not limited to, Intel® RSD (Rack Scale Design), NETCONF (Network Configuration Protocol), RESTCONF (Network Configuration Protocol), and other proprietary network communication methods.

In some examples, the one or more predetermined criteria comprises: each port in the plurality of port groups has at least one neighbor port address; ports in each port group of the plurality of port groups have the same corresponding match node in the plurality of match nodes; and each port in the plurality of port groups corresponds to a match node in the plurality of match nodes that is neither the first switch nor the second switch.

In accordance with another aspect of the present disclosure, a non-transitory computer-readable storage medium storing instructions is provided. When the instructions are executed by a processor, they cause the processor to perform operations that include: (1) requesting switch port data from a plurality of server systems and a plurality of switches of a multi-chassis system; (2) receiving the switch port data, the switch port data including internal and neighbor port addresses of the plurality of server systems and the plurality of switches; (3) determining a plurality of match ports and a plurality of match nodes; and (4) determining peer link ports for a first switch and a second switch of the plurality of switches. Each of the plurality of match ports has a port address matching one of the neighbor port addresses while each of the plurality of match nodes corresponds to one of the plurality of match ports. The peer link ports are a subset of the plurality of match ports. Each peer link port of the peer link ports belongs to one of the first switch the second switch; and corresponds to a match node of the plurality of match nodes that is the other one of the first switch the second switch In some examples, the instructions stored in the non-transitory computer-readable storage medium, when executed by a processor, causes the processor to perform operations further including: grouping a plurality of ports of the first switch and the second switch into a plurality of port groups, based upon the switch port data and one or more predetermined criteria; selecting a first subset of port groups from the plurality of port groups, a port group in the first subset of port groups having at least one port belonging to the first switch, and at least another port belonging to the second switch; and configuring all ports in each port group of the first subset of port groups as a same member port.

Additional features and advantages of the disclosure will be set forth in the description which follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. These drawings depict only example aspects of the disclosure and are not therefore to be considered to be limiting of its scope. The principles herein are described and explained with additional specificity and detail through the use of the accompanying drawings in which:

FIGS. 1C-1E illustrate examples of switch port data collected from a plurality of switches and a plurality of server systems in the multi-chassis system, in accordance with some implementations of the present disclosure;

FIG. 1F illustrates exemplary procedures for determining a plurality of match ports and a plurality of match nodes in the multi-chassis system, in accordance with some implementations of the present disclosure;

FIG. 1G illustrates an example of a plurality of match ports and a plurality of match nodes in the multi-chassis system of FIG. 1F, in accordance with some implementations of the present disclosure;

FIG. 1H illustrates an example of peer link ports for a first switch and a second switch in the multi-chassis system, in accordance with some implementations of the present disclosure;

FIG. 1I illustrates exemplary procedures for grouping a plurality of ports of a first switch and a second switch into a plurality of port groups, in accordance with some implementations of the present disclosure;

FIG. 1J illustrates exemplary procedures for selecting a first subset of port groups from a plurality of port groups and an example of the first subset of port groups, in accordance with some implementations of the present disclosure;

DETAILED DESCRIPTION

Figure 1A:
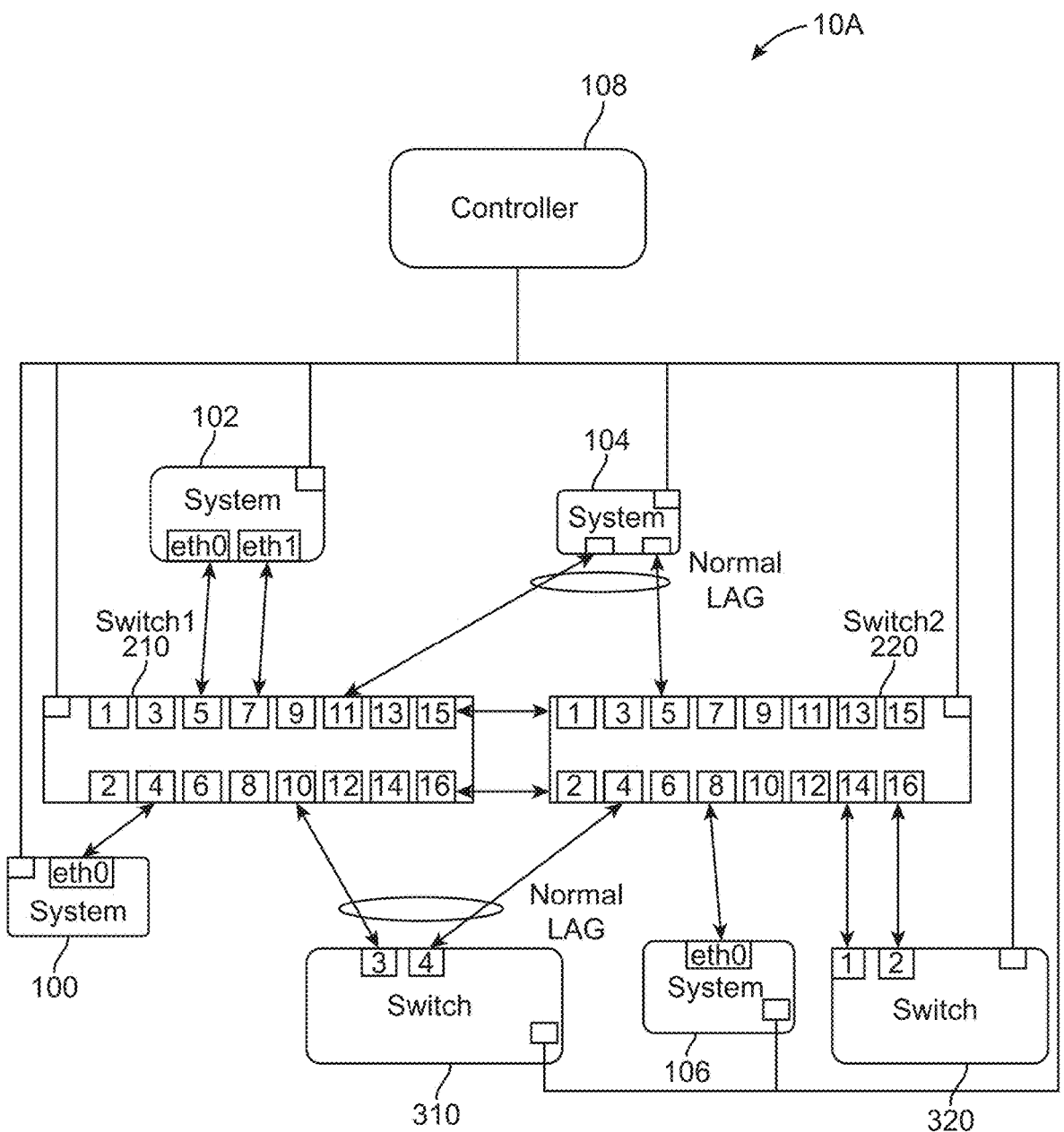
FIG. 1A is a schematic block diagram illustrating an exemplary multi-chassis system for automatically configuring multiple chassis links, in accordance with some implementations of the present disclosure.

The present disclosure can be embodied in many different forms. Representative embodiments are shown in the drawings, and will herein be described in detail, with the understanding that the present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed: the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Various examples of the present disclosure provide methods for automatically configuring multiple chassis links in a multi-chassis system using a management controller. The management controller can request and receive switch port data from a plurality of server systems and a plurality of switches of the multi-chassis system. Based upon received switch port data, the management controller can determine peer link ports for a first switch and a second switch of the plurality of switches; select suitable port groups from a plurality of ports of the first switch and the second switch based upon the received switch port data; and configure ports in each suitable port group as a MC-LAG member port for the corresponding suitable port group.

FIG. 1A is a schematic block diagram illustrating an exemplary system 10A for automatically configuring multiple chassis links, in accordance with some implementations of the present disclosure. In this example, the multi-chassis system 10A includes a management controller 108, server systems 100, 102, 104 and 106, and switches 210, 220, 310 and 320. The systems and switches in the multi-chassis system 10A can use various protocols to advertise their identity, capacity, and neighbors on a network of the system 10A. In some examples, the multi-chassis system 10A is compatible with IEEE 802.1AX™-2008 standard. The various protocols for advertising identity, capacity, and neighbors can include, but are not limited to LLDP (Link Layer Discovery Protocol), CDP (Cisco Discovery Protocol), or provision method(s) provided by specific vendors.

In some examples, the server systems 100, 102, 104 and 106 can include BIOS (basic input/output system) (not shown), at least one microprocessor or processor (not shown), a main memory (MEM) (not shown), and at least one power supply unit (PSU) (not shown). The at least one PSU receives an AC power from an AC power supply and supplies power to various components of the server system, such as the processor (not shown), PCIe slots (not shown), storage device (not shown), ISA slots (not shown), PCI slots (not shown), and a management device (not shown). After being powered on, the server systems 100, 102, 104 and 106 are configured to load software application from memory, computer storage device, or an external storage device to perform various operations. The storage device is structured into logical blocks that are available to an operating system and applications of the server systems. The logical blocks are configured to retain server data even when the server systems are powered off.

The BIOS can be any program instructions or firmware configured to initiate and identify various components of the server systems. The BIOS is an important system component that is responsible for initializing and testing hardware components of a corresponding server system. The BIOS can provide an abstraction layer for the hardware components, thereby providing a consistent way for applications and operating systems to interact with peripheral devices, such as a keyboard, a display, and other input/output devices.

In some configurations, the BIOS can run a system check prior to booting up an OS (operating system), e.g., the Microsoft Windows® OS, the Linux® OS, or any operating system on the server systems. The system check is a diagnostic system examination executed during initialization of the server systems. An example of system check includes a POST (Power-On Self-Test). The BIOS can handle major functions of POST and may offload some duties to other programs designed to initialize specific peripheral devices (e.g., video and SCSI (Small Computer System Interface) initialization). The major functions of POST may include: verifying CPU registers and the integrity of the BIOS code; checking basic components; examining system main memory; and passing control to other specialized BIOS extension. In some configurations, the BIOS may also handle additional POST functions including: discovering, initializing, and cataloging all system buses and devices; providing a user interface for updating system's configuration; and constructing a system environment required by the operating system.

The management device (not shown) (e.g., BMC (baseboard management controller) or RMC (rack management controller)) can communicate with the processor and storage device of the server system. In one example, this communication can occur via IPMI (Intelligent Platform Management Interface) messages using a system bus (e.g., IPMB (Intelligent Platform Management Bus/Bridge)). IPMB is an enhanced implementation of I²C (inter-integrated circuit) bus and is a message-based, hardware-level basic interface specification. However, the present disclosure contemplates that other communication types can be used between the management device and other components.

The memory (not shown) may include, but is not limited to, DRAM (dynamic random access memory), DDR DRAM (double data rate DRAM), SRAM (static RAM), or other types of suitable memory. The memory can be configured to store BIOS data of the server systems. In some configurations, BIOS data can be stored on the storage device.

In some examples, the server systems 100, 102, 104 and 106 can further comprise a flash storage device. The flash storage device can be a flash drive, a RAM (random access memory), a NVRAM (non-volatile random-access memory), or an EEPROM (electrically erasable programmable read-only memory). The flash storage device can be configured to store the system configurations such as BIOS data.

The processor (not shown) can be a CPU (central processing unit) configured to execute program instructions for specific functions. For example, during a booting process, the processor can access BIOS data stored in the management device or the flash storage device, and execute the BIOS to initialize the server systems. After the booting process, the processor can execute an operating system in order to perform and manage specific tasks for the server systems.

In some implementations, the management device can determine that the operating systems on the server systems have been updated; determine whether a firmware update (e.g., update of nominal media rotation rate) is available; and automatically download the firmware update from a corresponding vendor. In some examples, the management controller can monitor availability of firmware updates (e.g., updates of nominal media rotation rate) by communicating with a central management server, and downloading latest firmware updates whenever the updates become available. In some examples, the management controller can receive the firmware updates out-of-band when the server systems are not in operation, or even when the server systems are powered off.

In some configurations, the processor (not shown) can be multi-core processors, each of which is coupled together through a CPU bus. The plurality of PCI slots or PCIe slots can be used for connections and buses such as PCI Express x1, USB 2.0, SMBus, SIM card, future extension for another PCIe lane, 1.5 V and 3.3 V power, and wires to diagnostics LEDs on the server system 100's chassis. PCI cards that can be used in the plurality of PCI slots 170 include, but are not limited to, NICs (network interface cards), sound cards, modems, TV tuner cards, disk controllers, video cards, SCSI (small computer system interface) adapters, and PCMCIA (personal computer memory card international association) cards.

In FIG. 1A, the management controller 108 is connected to the server systems 100, 102, 104 and 106 and the switches 210, 220, 310 and 320 of the multi-chassis system 10A. Each of the switches 210 and 220 comprises ports 1-16. Port 4, ports 5 and 7, port 11, and port 10 of the switch1 210 are connected to the system 100, the system 102, the system 104, and the switch 310, respectively. Port 5, ports 14 and 16, port 8, and port 4 of the switch2 220 are connected to the system 104, the switch 320, the system 106, and the switch 310, respectively. Connection between port 11 of the switch1 210 and the server system 104, and connection between port 5 of the switch2 220 and the server system 104, are a normal LAG (link aggregation) that is configured to provide redundancy and increase throughput. Connection between port 10 of the switch1 210 and port 2 of the switch 310, and connection between port 4 of the switch2 220 and port 4 of the switch 310, are also a normal LAG.

The management controller 108 can request and get switch port data from the server systems 100, 102, 104, and 106 and the switches 210, 220, 310, and 320. The management controller 108 can use a variety of protocols to request the switch port data. The variety of protocols includes, but is not limited to, Intel® RSD (Rack Scale Design), NETCONF (Network Configuration Protocol), RESTCONF (Network Configuration Protocol), and other proprietary network communication methods to let the management controller 108 issue one or more commands to access the port data from the server systems 100, 102, 104, and 106 and the switches 210, 220, 310, and 320.

Figure 1B:
FIG. 1B illustrates an exemplary code command to get MAC address of neighbor switch port supported in Intel® RSD API, in accordance with some implementations of the present disclosure.

The switch port data can include neighbor port information (e.g., neighbor port address(es)) and self-port information (e.g., internal port address(es)). Neighbor port information or neighbor port address(es) includes a unique value (e.g., MAC address), such that the management controller 108 can identify a corresponding neighbor port. FIG. 1B illustrates an example of code command to get the MAC address of neighbor switch port supported in Intel® RSD API. In this example, the MAC address of a neighbor port is "54:ab:3a:ca:b4:a1."

The self-port information or internal port address contains data to identify which network switch that a corresponding port belongs to, denoted as "Node ID" in FIGS. 1C-1J, and is a set of unique values (e.g., MAC addresses) that can represent corresponding ports.

FIG. 1C illustrates an example of switch port data that the management controller 108 collects from the switches 210. The switch port data includes a plurality of port IDs (identifications), a plurality of node IDs, a plurality of MAC addresses for internal ports, and a plurality of neighbor MAC addresses for neighbor ports. Similarly, FIG. 1D illustrates an example of switch port data that the management controller 108 collects from the switches 220. FIG. 1E illustrates an example of switch port data that the management controller 108 collects from the remaining server systems and switches in the multi-chassis system 10A.

The management controller 108 can further compare received switch port data from the server systems 100, 102, 104 and 106 and the switches 210, 220, 310 and 320, and determine a plurality of match ports and a plurality of match nodes, as illustrated in FIG. 1F. In this example, the management controller 108 goes through neighbor MAC addresses and compares the neighbor MAC addresses with MAC address of each port, at procedures 4a and 4b, respectively. The management controller 108 then selects each port having a matching MAC address as a match port, and selects a corresponding node of the match port as a match node, at procedures 4c and 4d, respectively. An example of the plurality of match ports and the plurality of match nodes is illustrated in FIG. 1G. In this example, each of the plurality of match ports has a port address matching one of the neighbor port addresses. Each of the plurality of match nodes corresponds to one of the plurality of match ports.

The management controller 108 can determine peer link ports in the multi-chassis system 10A based upon the plurality of match ports and the plurality of match nodes. The peer link ports are a subset of the plurality of match ports. FIG. 1H illustrates an example of peer link ports for the switch1 210 and the switch2 220. In FIG. 1H, each peer link port of the peer link ports belongs to one of the switch1 210 and the switch2 220, and corresponds to a match node of the plurality of match nodes that is the other one of the switch1 210 and the switch2 220. For example, peer link ports P15 and P16 are a subset of the plurality of match port and belong to the switch1 210. The peer link ports P15 and 16 correspond to the switch2 220, which is one of the plurality of match nodes. For another example, peer link ports $P_{m+1}$ and $P_{m+2}$ are a subset of the plurality of match port and belong to the switch2 220. The peer link ports $P_{m+1}$ and $P_{m+2}$ correspond to the switch1 210, which is one of the plurality of match nodes.

The management controller 108 can further select suitable port groups from a plurality of ports of the switch1 210 and the switch2 220, based upon the received switch port data. The management controller 108 can configure ports in each suitable port group as a MC-LAG member port for the corresponding suitable port group.

FIG. 1I illustrates procedures for the management controller 108 to group a plurality of ports of the switch1 210 and the switch2 220 into a plurality of port groups, based upon the received switch port data and one or more predetermined criteria. The one or more predetermined criteria comprises: (1) each port in the plurality of port groups has at least one neighbor port address; (2) ports in each port group of the plurality of port groups have the same corresponding match node in the plurality of match nodes; and (3) each port in the plurality of port groups corresponds to a match node in the plurality of match nodes that is neither the switch1 210 nor the switch2 220. For example, ports P5 and P7 each have at least one neighbor port address, "10:20:00:00:00:02" and "10:20:00:00:00:03," respectively. Ports P5 and P7 have the same corresponding match node, "System 102," which is neither the switch1 210 nor the switch2 220.

FIG. 1J illustrates procedures for the management controller 108 to select a first subset of port groups from the plurality of port groups and an example of the first subset of port groups. A port group in the first subset of port groups has at least one port belonging to the switch1 210 and at least another port belonging to the switch2 220. In FIG. 1J, two port groups, "P10 and $P_{m+4}$," and "P11 and $P_{m+5}$," are selected into the first subset of port groups. In the port group of "P10 and $P_{m+4}$", P10 belongs to the switch 1 210 while $P_{m+4}$ belongs to the switch2 220. Similarly, in the port group of "P11 and $P_{m+5}$", P11 belongs to the switch 1 210 while $P_{m+5}$ belongs to the switch2 220.

The management controller 108 can then configure all ports in each port group of the first subset port group as a same member port. For example, the management controller 108 can configure P10 and $P_{m+4}$ as a same member port, and configure P11 and $P_{m+5}$ as a same member port.

Although only certain components are shown within the exemplary system 10A in FIG. 1A, various types of electronic or computing components that are capable of processing or storing data, receiving or transmitting signals, or providing fresh air to downstream components can also be included in the exemplary system 10A. Further, the electronic or computing components in the exemplary system 10A can be configured to execute various types of application, and/or can use various types of operating systems. These operating systems can include, but are not limited to, Android, BSD (Berkeley Software Distribution), iOS (iPhone OS), Linux, OS X, Unix-like Real-time Operating System (e.g., QNX), Microsoft Windows, Window Phone, and IBM z/OS.

Depending on the desired implementation for the exemplary system 10A, a variety of networking and messaging protocols can be used, including but not limited to, TCP/IP, OSI (open systems interconnection), FTP (file transfer protocol), UpnP (universal plug and play), NFS (network file system), CIFS (common internet file system), AppleTalk etc. As would be appreciated by those skilled in the art, the exemplary system 100 illustrated in FIG. 1 is used for purposes of explanation. Therefore, a network system can be implemented with many variations, as appropriate, yet still provide a configuration of network platform in accordance with various examples of the present disclosure.

In exemplary configuration of FIG. 1A, the exemplary system 10A can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well, within the scope of various examples.

The above discussion is meant to be illustrative of the principles and various examples of the present disclosure. Numerous variations and modifications will become apparent once the above disclosure is fully appreciated.

Figure 2:
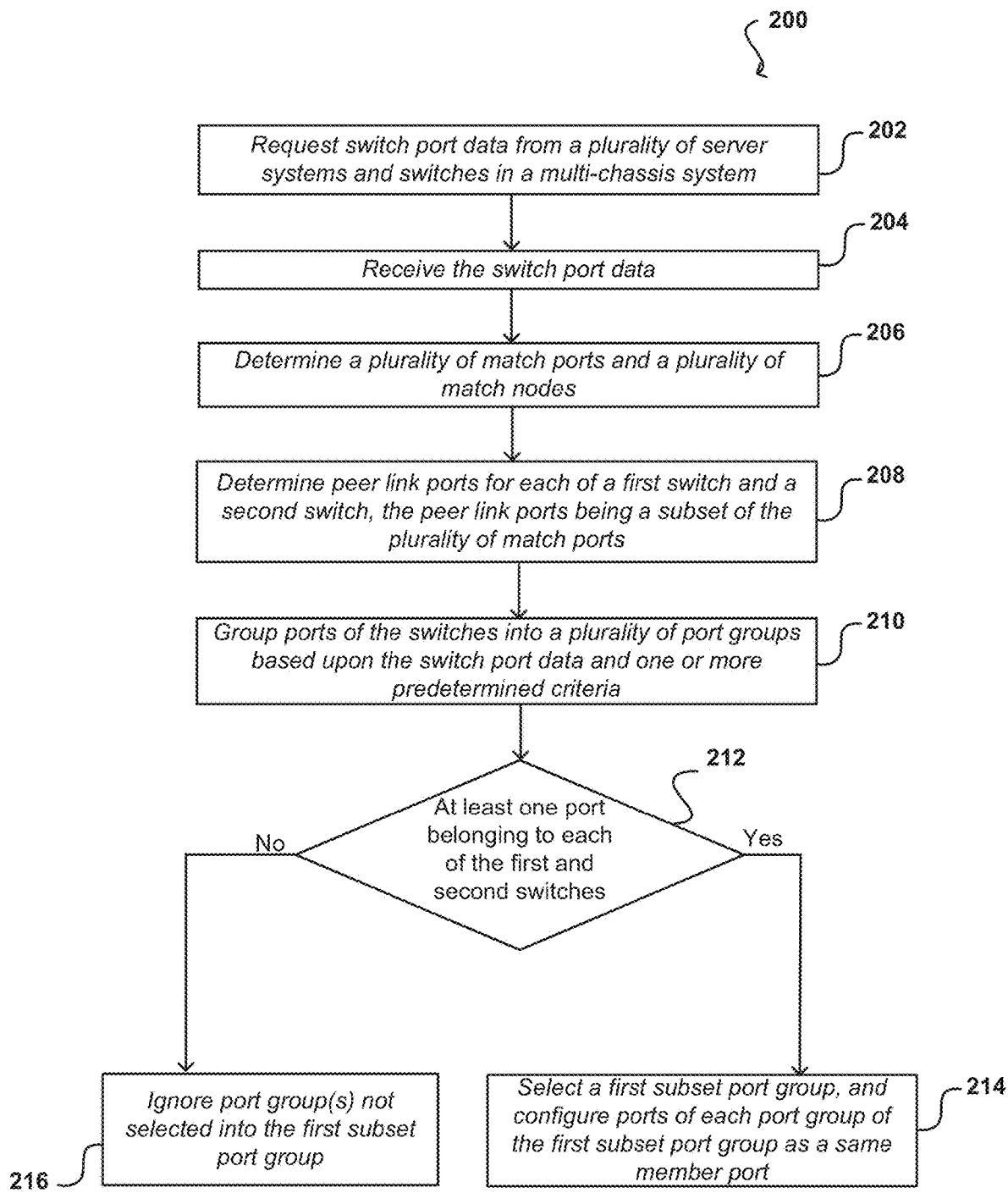
FIG. 2 is an exemplary method for automatically configuring multiple chassis links in a multi-chassis system, in accordance with an implementation of the present disclosure.

FIG. 2 is an exemplary method for automatically configuring multiple chassis links in a multi-chassis system, in accordance with an implementation of the present disclosure. It should be understood that the exemplary method 200 is presented solely for illustrative purposes, and that in other methods in accordance with the present disclosure can include additional, fewer, or alternative steps performed in similar or alternative orders, or in parallel. The exemplary method 200 starts at step 202 by requesting switch port data from a plurality of server systems and a plurality of switches in the multi-chassis system, as illustrated in FIGS. 1A and 1B. A management controller of the multi-chassis system can use a variety of protocols to request the switch port data, which includes, but is not limited to, Intel® RSD (Rack Scale Design) API, NETCONF, RESTCONF, and other proprietary network communication methods. The plurality of switches includes a first switch and a second switch.

At step 204, the management controller can receive the switch port data from the plurality of server systems and the plurality of switches, as illustrated in FIGS. 1A-1J. The switch port data includes a plurality of port IDs (identifications), a plurality of node IDs, a plurality of MAC addresses for internal ports, and a plurality of neighbor port MAC addresses for neighbor ports.

At step 206, the management controller can determine a plurality of match ports and a plurality of match nodes, as illustrated in FIGS. 1F and 1G. Each of the plurality of match ports has a port address that matches one of the neighbor port addresses. Each of the plurality of match nodes corresponds to one of the plurality of match ports.

At step 208, the management controller can determine peer link ports for the first switch and the second switch, as illustrated in FIG. 1H. The peer link ports are a subset of the plurality of match ports. Each of the peer link ports belongs to one of a first switch and a second switch, and corresponds to a match node of the plurality of match nodes that is the other one of the first switch the second switch.

At step 210, the management controller can group a plurality of ports of the first switch and the second switch into a plurality of port groups, based upon the switch port data and one or more predetermined criteria, as illustrated in FIG. 1I. The one or more predetermined criteria comprises:

(1) each port in the plurality of port groups has at least one neighbor port address; (2) ports in each port group of the plurality of port groups have the same corresponding match node in the plurality of match nodes; and (3) each port in the plurality of port groups corresponds to a match node in the plurality of match nodes that is neither the first switch nor the second switch.

At step 212, the management controller can determine whether a port group of the plurality of port groups has at least one port belonging to the first switch, and at least one port belonging to the second switch, as illustrated in FIG. 1J. At step 214, the management controller can select a first subset of port groups from the plurality of port groups, as illustrated in FIG. 1J. A port group in the first subset of port groups has at least one port belonging to the first switch and at least another port belonging to the second switch. The management controller can further configure all ports in a port group of the first subset of port groups as a MC-LA member port for the port group.

At step 216, the management controller can ignore port group(s) of the plurality of port groups that are not in the first subset of port groups, as illustrated in FIG. 1J. The exemplary method 200 can be dynamically repeated in an event that the topology of the multi-chassis system changes.

Figure 3:
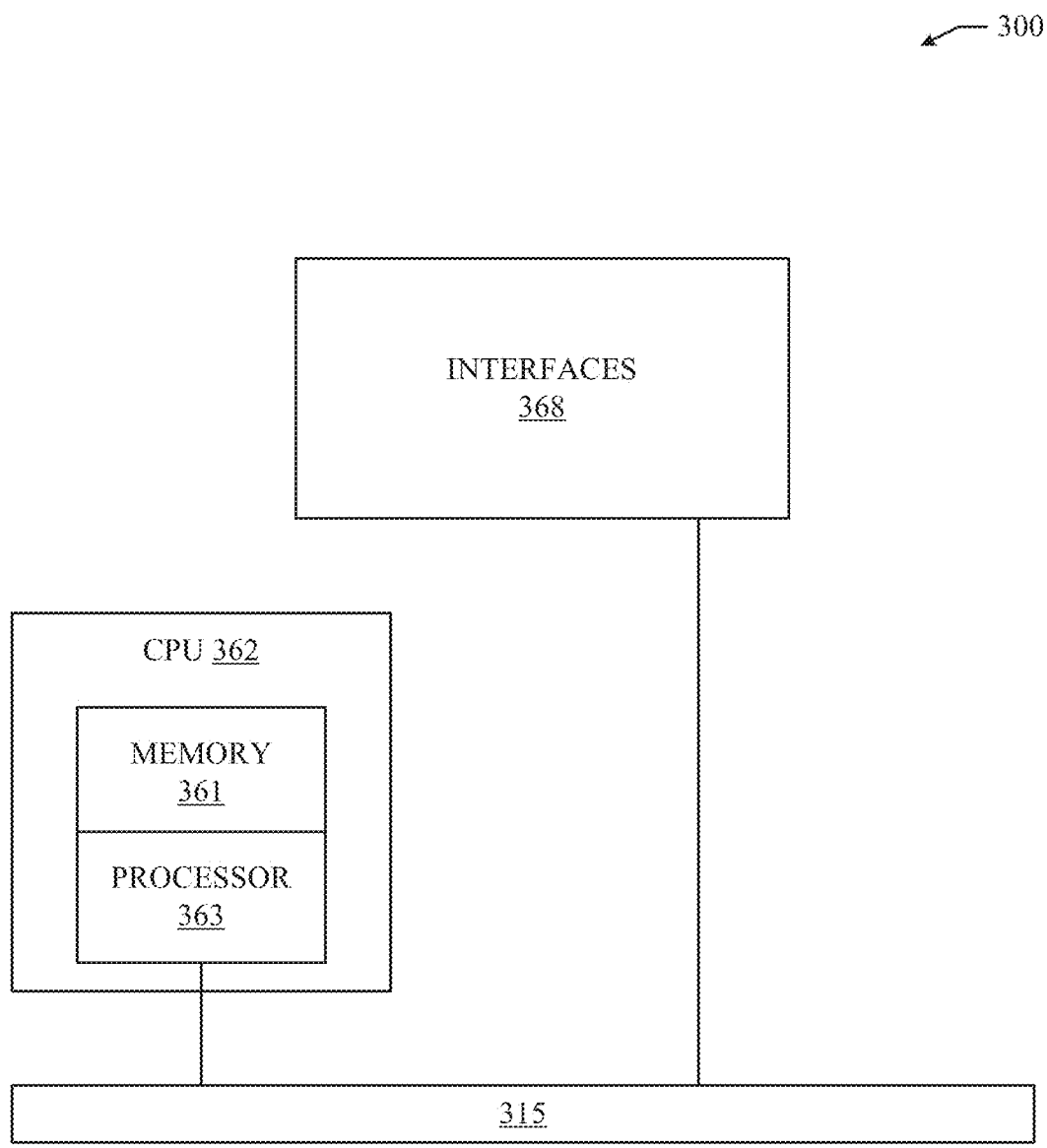
FIG. 3 illustrates an exemplary computing device in accordance with various implementations of the disclosure.
Figure 4:
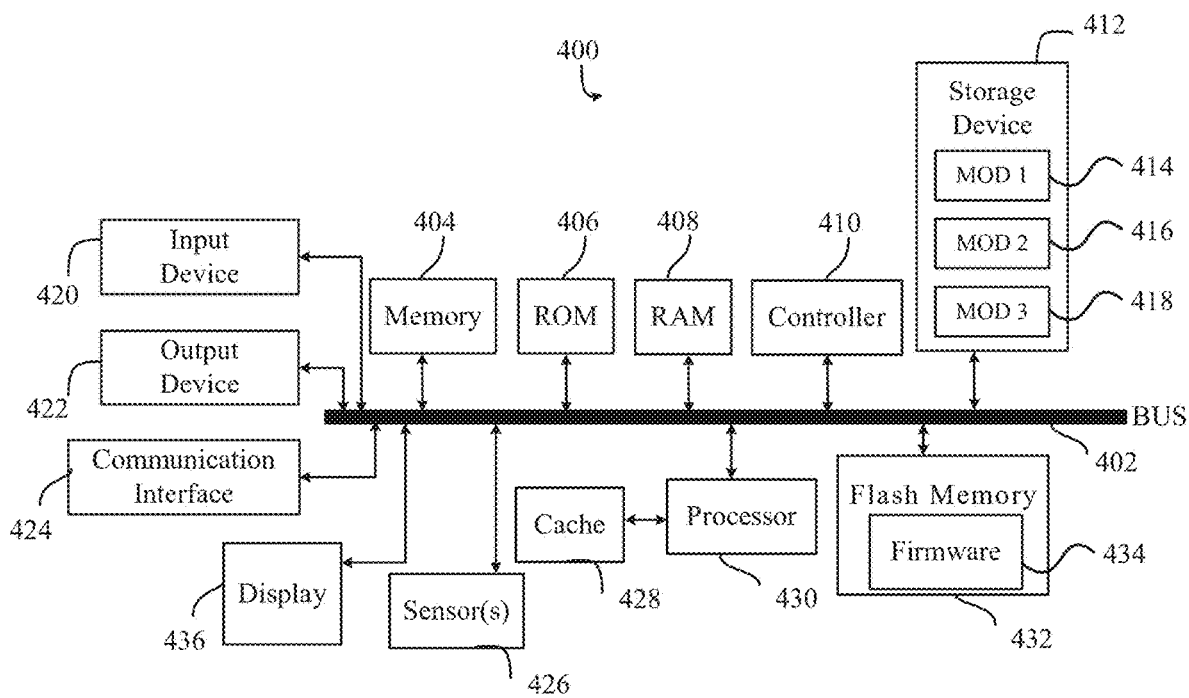
FIGS. 4 and 5 illustrate exemplary systems in accordance with various examples of the present disclosure.
Figure 5:
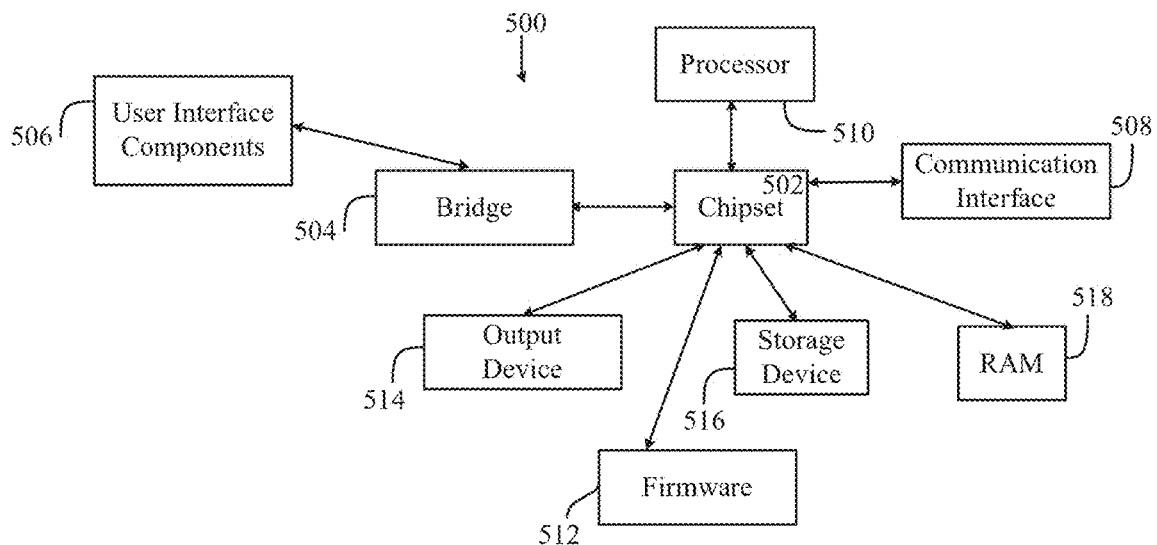

A brief introductory description of example systems and networks, as illustrated in FIGS. 3-5, is disclosed herein. These variations shall be described herein as the various examples are set forth. The present disclosure now turns to FIG. 3.

FIG. 3 illustrates an example computing device 300 suitable for implementing the present disclosure. Computing device 300 includes a master CPU (central processing unit) 362, interfaces 368, and a bus 315 (e.g., a PCI bus). When acting under the control of appropriate software or firmware, the CPU 362 is responsible for executing packet management, error detection, and/or routing functions, such as miscabling detection functions. The CPU 362 preferably accomplishes all these functions under the control of software, including an operating system and any appropriate applications software. CPU 362 can include one or more processors 363 such as a processor from the Motorola family of microprocessors, or the MIPS family of microprocessors. In an alternative example, processor 363 is specially designed hardware for controlling the operations of the computing device 300. In a specific example, a memory 361 (such as non-volatile RAM and/or ROM) also forms part of CPU 362. However, there are many different ways in which memory can be coupled to the system.

The interfaces 368 are typically provided as interface cards (sometimes referred to as "line cards"). Generally, they control the sending and receiving of data packets over the network and sometimes support other peripherals used with the computing device 300. Among the interfaces that can be provided are Ethernet interfaces, frame relay interfaces, cable interfaces, DSL interfaces, token ring interfaces, and the like. In addition, various high-speed interfaces can be provided, such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control, and management. By providing separate processors for the communications intensive tasks, these interfaces allow the master microprocessor 362 to efficiently perform routing computations, network diagnostics, security functions, etc.

Although the system shown in FIG. 3 is one specific computing device of the present disclosure, it is by no means the only network device architecture on which the present patent application can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 361) configured to store program instructions for the general-purpose network operations and mechanisms for roaming, route optimization and routing functions described herein. The program instructions can control the operation of an operating system and/or one or more applications, for example. The memory or memories can also be configured to store tables, such as mobility binding, registration, and association tables, etc.

FIGS. 4 and 5 illustrate example system embodiments. The more appropriate embodiment will be apparent to those of ordinary skill in the art when practicing the present disclosure. Persons of ordinary skill in the art will also readily appreciate that other system embodiments are possible.

FIG. 4 illustrates a system bus computing system architecture 400 wherein the components of the system are in electrical communication with each other using a bus 402. Example system 400 includes a processing unit (CPU or processor) 430 and a system bus 402, that couples various system components, including the system memory 404, such as read only memory (ROM) 406 and random access memory (RAM) 408, to the processor 430. The system 400 can include a cache of high-speed memory connected directly with, in close proximity to, or integrated as part of the processor 430. The system 400 can copy data from the memory 404 and/or the storage device 412 to the cache 428 for quick access by the processor 430. In this way, the cache can provide a performance boost that avoids processor 430 delays while waiting for data. These and other modules can control or be configured to control the processor 430 to perform various actions. Other system memory 404 may be available for use as well. The memory 404 can include multiple different types of memory with different performance characteristics. The processor 430 can include any general purpose processor and a hardware module or software module, such as module 1 414, module 2 416, and module 3 418 stored in storage device 412, configured to control the processor 430, as well as a special-purpose processor where software instructions are incorporated into the actual processor design. The processor 430 may essentially be a completely self-contained computing system, containing multiple cores or processors, a bus, memory controller, cache, etc. A multi-core processor may be symmetric or asymmetric.

To enable user interaction with the computing device 400, an input device 420 can represent any number of input mechanisms, such as a microphone for speech, a touch-sensitive screen for gesture or graphical input, keyboard, mouse, motion input, and so forth. An output device 422 can also be one or more of a number of output mechanisms known to those of skill in the art. In some instances, multimodal systems can enable a user to provide multiple types of input to communicate with the system 400. The communications interface 424 can generally govern and manage the user input and system output. There is no restriction on operating on any particular hardware arrangement, and therefore the basic features here may easily be substituted for improved hardware or firmware arrangements as they are developed.

Storage device 412 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 408, read only memory (ROM) 406, and hybrids thereof.

The storage device 412 can include software modules 414, 416, 418 for controlling the processor 430. Other hardware or software modules are contemplated. The storage device 412 can be connected to the system bus 402. In one aspect, a hardware module that performs a particular function can include the software component stored in a computer-readable medium in connection with the necessary hardware components, such as the processor 430, bus 402, display 436, and so forth, to carry out the function.

The controller 410 can be a specialized microcontroller or processor on the system 400, such as a BMC (baseboard management controller). In some cases, the controller 410 can be part of an Intelligent Platform Management Interface (IPMI). Moreover, in some cases, the controller 410 can be embedded on a motherboard or main circuit board of the system 400. The controller 410 can manage the interface between system management software and platform hardware. The controller 410 can also communicate with various system devices and components (internal and/or external), such as controllers or peripheral components, as further described below.

The controller 410 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 410 to initiate or conduct specific hardware recovery procedures or operations, as further described below.

Different types of sensors (e.g., sensors 426) on the system 400 can report to the controller 410 on parameters, such as cooling fan speeds, power status, operating system (OS) status, hardware status, and so forth. The controller 410 can also include a system event log controller and/or storage for managing and maintaining events, alerts, and notifications received by the controller 410. For example, the controller 410 or a system event log controller can receive alerts or notifications from one or more devices and components, and maintain the alerts or notifications in a system event log storage component.

Flash memory 432 can be an electronic non-volatile computer storage medium or chip that can be used by the system 400 for storage and/or data transfer. The flash memory 432 can be electrically erased and/or reprogrammed. Flash memory 432 can include EPROM (erasable programmable read-only memory), EEPROM (electrically erasable programmable read-only memory), ROM, NVRAM, or CMOS (complementary metal-oxide semiconductor), for example. The flash memory 432 can store the firmware 434 executed by the system 400 when the system 400 is first powered on, along with a set of configurations specified for the firmware 434. The flash memory 432 can also store configurations used by the firmware 434.

The firmware 434 can include a Basic Input/Output System or its successors or equivalents, such as an EFI (Extensible Firmware Interface) or UEFI (Unified Extensible Firmware Interface). The firmware 434 can be loaded and executed as a sequence program each time the system 400 is started. The firmware 434 can recognize, initialize, and test hardware present in the system 400 based on the set of configurations. The firmware 434 can perform a self-test, such as a POST (Power-on-Self-Test), on the system 400. This self-test can test functionality of various hardware components such as hard disk drives, optical reading devices, cooling devices, memory modules, expansion cards, and the like. The firmware 434 can address and allocate an area in the memory 404, ROM 406, RAM 408, and/or storage device 412, to store an operating system (OS). The firmware 434 can load a boot loader and/or OS, and give control of the system 400 to the OS.

The firmware 434 of the system 400 can include a firmware configuration that defines how the firmware 434 controls various hardware components in the system 400. The firmware configuration can determine the order in which the various hardware components in the system 400 are started. The firmware 434 can provide an interface, such as an UEFI, that allows a variety of different parameters to be set, which can be different from parameters in a firmware default configuration. For example, a user (e.g., an administrator) can use the firmware 434 to specify clock and bus speeds; define what peripherals are attached to the system 400; set monitoring of health (e.g., fan speeds and CPU temperature limits); and/or provide a variety of other parameters that affect overall performance and power usage of the system 400.

While firmware 434 is illustrated as being stored in the flash memory 432, one of ordinary skill in the art will readily recognize that the firmware 434 can be stored in other memory components, such as memory 404 or ROM 406. However, firmware 434 is illustrated as being stored in the flash memory 432 as a non-limiting example for explanation purposes.

System 400 can include one or more sensors 426. The one or more sensors 426 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 426 can communicate with the processor, cache 428, flash memory 432, communications interface 424, memory 404, ROM 406, RAM 408, controller 410, and storage device 412, via the bus 402, for example. The one or more sensors 426 can also communicate with other components in the system via one or more different means, such as inter-integrated circuit (I2C), general purpose output (GPO), and the like.

FIG. 5 illustrates an example computer system 500 having a chipset architecture that can be used in executing the described method(s) or operations, and generating and displaying a graphical user interface (GUI). Computer system 500 can include computer hardware, software, and firmware that can be used to implement the disclosed technology. System 500 can include a processor 510, representative of any number of physically and/or logically distinct resources capable of executing software, firmware, and hardware configured to perform identified computations. Processor 510 can communicate with a chipset 502 that can control input to and output from processor 510. In this example, chipset 502 outputs information to output device 514, such as a display, and can read and write information to storage device 516, which can include magnetic media, and solid state media, for example. Chipset 502 can also read data from and write data to RAM 518. A bridge 504 for interfacing with a variety of user interface components 506, can be provided for interfacing with chipset 502. Such user interface components 506 can include a keyboard, a microphone, touch detection and processing circuitry, a pointing device, such as a mouse, and so on. In general, inputs to system 500 can come from any of a variety of sources, machine generated and/or human generated.

Chipset 502 can also interface with one or more communication interfaces 508 that can have different physical interfaces. Such communication interfaces can include interfaces for wired and wireless local area networks, for broadband wireless networks, and for personal area networks. Some applications of the methods for generating, displaying, and using the GUI disclosed herein can include receiving ordered datasets over the physical interface, or be generated by the machine itself by processor 510 analyzing data stored in storage 516 or 518. Further, the machine can receive inputs from a user via user interface components 506 and execute appropriate functions, such as browsing functions by interpreting these inputs using processor 510.

Moreover, chipset 502 can also communicate with firmware 512, which can be executed by the computer system 500 when powering on. The firmware 512 can recognize, initialize, and test hardware present in the computer system 500 based on a set of firmware configurations. The firmware 512 can perform a self-test, such as a POST, on the system 500. The self-test can test the functionality of the various hardware components 502-518. The firmware 512 can address and allocate an area in the memory 518 to store an OS. The firmware 512 can load a boot loader and/or OS, and give control of the system 500 to the OS. In some cases, the firmware 512 can communicate with the hardware components 502-510 and 514-518. Here, the firmware 512 can communicate with the hardware components 502-510 and 514-518 through the chipset 502, and/or through one or more other components. In some cases, the firmware 512 can communicate directly with the hardware components 502-510 and 514-518.

It can be appreciated that example systems 300, 400 and 500 can have more than one processor (e.g., 363, 430, 510), or be part of a group or cluster of computing devices networked together to provide greater processing capability.

For clarity of explanation, in some instances, the present disclosure may be presented as including individual functional blocks including functional blocks, including devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code. Examples of computer-readable media that may be used to store instructions, information used, and/or information created during methods according to the described examples, include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The instructions, media for conveying such instructions, computing resources for executing them, and other structures for supporting such computing resources, are means for providing the functions described herein.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with any, or a combination of, the following technologies: a discrete logic circuit(s) having logic gates for implementing logic functions upon data signals; an application specific integrated circuit (ASIC) having appropriate combinational logic gates; programmable hardware such as a programmable gate array(s) (PGA); a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Methods according to the above-described examples can be implemented using computer-executable instructions that are stored, or are otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples, include magnetic or optical disks, flash memory, USB devices provided with non-volatile memory, networked storage devices, and so on.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run any variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C # or C++ or any scripting language, such as Perl, Python or TCL, as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers, or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a wireless or wired network card, an infrared computing device) and working memory, as described above. The computer-readable storage media reader can be connected with, or configured to receive, a computer-readable storage medium representing remote, local, fixed, and/or removable storage devices, as well as storage media for temporarily and/or more permanently containing, storing, transmitting and retrieving computer-readable information. The system and various devices will also typically include a number of software applications, modules, services or other elements located within at least one working memory device, including an operating system, and application programs such as a client application or Web browser. It should be appreciated that alternate examples can have numerous variations from those described above. For example, customized hardware might also be used and/or particular elements might be implemented in hardware, software (including portable software, such as applets), or both. Further, connection to other computing devices, such as network input/output devices, can be employed.

Storage media and computer readable media for containing code, or portions of code, can include any appropriate media known or used in the art, including storage media and computing media. The storage media and computing media can include, but are not limited to, volatile and non-volatile, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

What is claimed is:

1. A computer-implemented method for automatically configuring multiple chassis links in a multi-chassis system using a management controller, comprising:
    requesting switch port data from a plurality of server systems and a plurality of switches of the multi-chassis system;
    receiving the switch port data, the switch port data including internal port addresses and neighbor port addresses of the plurality of server systems and the plurality of switches;
    determining a plurality of match ports and a plurality of match nodes, wherein each of the plurality of match ports has a port address matching one of the neighbor port addresses in the switch port data, and wherein each of the plurality of match nodes corresponds to one of the plurality of match ports;
    selecting peer link ports for a first switch and a second switch of the plurality of switches from the plurality of match ports, wherein each of the peer link ports belongs to one of the first switch and the second switch, and wherein each of the peer link ports corresponds to a match node of the plurality of match nodes that is the other one of the first switch and the second switch;
    grouping a plurality of ports of the first switch and the second switch into a plurality of port groups, based upon the switch port data and one or more predetermined criteria, wherein the one or more predetermined criteria is selected from the group consisting of:
        each port in the plurality of port groups has at least one neighbor port address;
        ports in each port group of the plurality of port groups have the same corresponding match node in the plurality of match nodes; and
        each port in the plurality of port groups corresponds to a match node in the plurality of match nodes that is neither the first switch nor the second switch;
    determining a first subset of port groups, wherein each port group in the first subset of port groups has at least one port belonging to the first switch and at least another port belonging to the second switch; and
    configuring, by a management controller, all ports in each port group of the first subset of port groups as a same member port.

2. The computer-implemented method of claim 1, wherein the same member port is a Multi-Chassis Link Aggregation Group (MC-LAG) member port.

3. The computer-implemented method of claim 1, wherein determining the plurality of match ports and the plurality of match nodes further comprises:
    going through the neighbor port addresses for each port of the first switch and the second switch;
    grouping a specific port into the plurality of match ports if the specific port's address matches any of the neighbor port addresses of the first switch and the second switch; and
    grouping a corresponding node that contains the specific port into the plurality of match nodes.

4. The computer-implemented method of claim 1, wherein requesting the switch port data from the plurality of server systems, and the plurality of switches of the multi-chassis system comprises:
    requesting the switch port data from the plurality of server systems and the plurality of switches using Intel® Rack Scale Design (RSD), Network Configuration Protocol (NETCONF), or Network Configuration Protocol (RESTCONF).

5. The computer-implemented method of claim 1, wherein the multi-chassis system is compatible with an IEEE 802.1AX™-2008 standard.

6. The computer-implemented method of claim 1, wherein the plurality of server systems and the plurality of switches are configured to advertise corresponding identity, capacity, and neighbors on a network of the multi-chassis system using Link Layer Discovery Protocol (LLDP), or Cisco Discovery Protocol (CDP).

7. The computer-implemented method of claim 1, wherein the management controller is a specific system, a baseboard management controller (BMC) or a rack management controller (RMC) in the multi-chassis system that configures MC-LAG network switches.

8. A system for automatically configuring multiple chassis links in a multi-chassis system, comprising:
    a processor; and
    a non-transitory computer-readable medium storing instructions that, when executed by the processor, cause the system to perform operations comprising:
        requesting switch port data from a plurality of server systems and a plurality of switches of the multi-chassis system;
        receiving the switch port data, the switch port data including internal port addresses and neighbor port addresses corresponding to the plurality of server systems and the plurality of switches;
        determining a plurality of match ports and a plurality of match nodes, wherein each of the plurality of match ports has a port address matching one of the neighbor port addresses in the switch port data, and wherein each of the plurality of match nodes corresponds to one of the plurality of match ports;
        selecting peer link ports for a first switch and a second switch of the plurality of switches from the plurality of match ports, wherein each of the peer link ports belongs to one of the first switch and the second switch, and wherein each of the peer link ports corresponds to a match node of the plurality of match nodes that is the other one of the first switch and the second switch;

grouping a plurality of ports of the first switch and the second switch into a plurality of port groups, based upon the switch port data and one or more predetermined criteria, wherein the one or more predetermined criteria is selected from the group consisting of:

each port in the plurality of port groups has at least one neighbor port address;

ports in each port group of the plurality of port groups have the same corresponding match node in the plurality of match nodes; and each port in the plurality of port groups corresponds to a match node in the plurality of match nodes that is neither the first switch nor the second switch;

determining a first subset of port groups, wherein each port group in the first subset of port groups has at least one port belonging to the first switch and at least another port belonging to the second switch; and configuring, by a management controller, all ports in each port group of the first subset of port groups as a same member port.

9. The system of claim 8, wherein the same member port is a Multi-Chassis Link Aggregation Group (MC-LAG) member port.

10. The system of claim 8, wherein the operations of determining the plurality of match ports, and the plurality of match nodes further comprise:

going through the neighbor port addresses for each port of the first switch and the second switch;

grouping a specific port into the plurality of match ports if the specific port's address matches any of the neighbor port addresses of the first switch and the second switch; and grouping a corresponding node that contains the specific port into the plurality of match nodes.

11. The system of claim 8, wherein the operations of requesting the switch port data from the plurality of server systems and the plurality of switches comprise:

requesting the switch port data from the plurality of server systems and the plurality of switches using Intel® Rack Scale Design(RSD), Network Configuration Protocol (NETCONF), or Network Configuration Protocol (RESTCONF).

12. The system of claim 8, wherein the plurality of server systems and the plurality of switches are configured to advertise corresponding identity, capacity, and neighbors on a network of the multi-chassis system, using LLDP (Link Layer Discovery Protocol), or CDP (Cisco Discovery Protocol).

13. The system of claim 8, wherein the multi-chassis system is compatible with an IEEE 802.1AX™-2008 standard.

14. A non-transitory computer-readable storage medium including instructions that, when executed by at least one processor of a system, cause the system to perform operations comprising:

requesting switch port data from a plurality of server systems and a plurality of switches of a multi-chassis system;

receiving the switch port data, the switch port data including internal port addresses and neighbor port addresses of the plurality of server systems and the plurality of switches;

determining a plurality of match ports and a plurality of match nodes, wherein each of the plurality of match ports has a port address matching one of the neighbor port addresses in the switch port data, and wherein each of the plurality of match nodes corresponds to one of the plurality of match ports;

selecting peer link ports for a first switch and a second switch of the plurality of switches from the plurality of match ports, wherein each of the peer link ports belongs to one of the first switch the second switch, and wherein each of the peer link ports corresponds to a match node of the plurality of match nodes that is the other one of the first switch and the second switch;

grouping a plurality of ports of the first switch and the second switch into a plurality of port groups, based upon the switch port data and one or more predetermined criteria, wherein the one or more predetermined criteria is selected from the group consisting of:

each port in the plurality of port groups has at least one neighbor port address;

ports in each port group of the plurality of port groups have the same corresponding match node in the plurality of match nodes; and each port in the plurality of port groups corresponds to a match node in the plurality of match nodes that is neither the first switch nor the second switch;

determining a first subset of port groups, wherein each port group in the first subset of port groups has at least one port belonging to the first switch and at least another port belonging to the second switch; and configuring, by a management controller, all ports, in each port group of the first subset of port groups, as a same member port.

* * * * *